United States Patent [19]

Beach et al.

[11] Patent Number: 4,842,221
[45] Date of Patent: Jun. 27, 1989

[54] LIGHTNING HARDENED TETHER CABLE AND AN AEROSTAT TETHERED TO A MOORING SYSTEM THEREWITH

[75] Inventors: Glenn R. Beach, Columbia; Myron S. Wheeler, Catorsville; Paul R. Jakubowski, Lutherville, all of Md.

[73] Assignee: Westinghouse Electric Corp., Pittsburgh, Pa.

[21] Appl. No.: 184,530

[22] Filed: Apr. 21, 1988

[51] Int. Cl.$^4$ .................. B64F 1/14; H02G 13/00; H01B 7/04
[52] U.S. Cl. .......................... 244/115; 174/2; 174/6; 174/107; 244/1 A; 244/33; 343/706
[58] Field of Search .............. 174/2, 3, 6, 78, 102 R, 174/107, 109, 131 A; 244/1 A, 33, 115, 116; 343/706, 848, 849

[56] References Cited

U.S. PATENT DOCUMENTS

| 3,553,341 | 1/1971 | Hureau ................................ 174/6 |
| 4,402,479 | 9/1983 | Phipps, III et al. ............... 244/116 |
| 4,476,576 | 10/1984 | Wheeler et al. ............... 343/706 X |

FOREIGN PATENT DOCUMENTS 572270 1/1976 Switzerland ............... 174/6

OTHER PUBLICATIONS

Fleming, P., "Skyhooks for Antennae", *Telephone Engineer & Management*, vol. 80, No. 13, Jul. 1, 1976, pp. 42 and 43.

Primary Examiner—Laramie E. Askin
Attorney, Agent, or Firm—D. Schron

[57] ABSTRACT

An improved tether having a central strength member comprised of layers of synthetic fibers surrounded by a thin weatherproof plastic barrier. A current carrying metallic braid surrounds the weatherproof barrier and in a portion of the tether is of a higher strength and denser weave copper than in other areas. An outer protective jacket surrounds the metallic braid and one or more windows are formed by removing a short longitudinal section of the outer jacket above an area of the tether which has the high density metallic braid. The weatherproof barrier, at least in the area where windows are formed, is heat sealed to form a seamless barrier. A relatively soft copper wire is wound around the metallic braid in the window area so as to transfer lightning induced currents in the metallic braid of the tether to a grounding system. The tether may be used in conjunction with an aerostat with the mooring system for the aerostat including a flying sheave which contacts one or more of the windows formed in the tether to complete the discharge path to a ground rod electrically connected to the mooring system.

19 Claims, 5 Drawing Sheets

LIGHTNING HARDENED TETHER CABLE AND AN AEROSTAT TETHERED TO A MOORING SYSTEM THEREWITH

BACKGROUND OF THE INVENTION

1. Field of the Invention

The invention in general relates to an improved lightning hardened cable, and more particularly to a cable which may be used as a tether in an aerostat system.

2. Background Information

The use of lighter than air vehicles as high altitude platforms for electronic euqipment has been known for many years. By suspending electronic payloads from a stabilized platform beneath an aerodynamically shaped balloon, called an aerostat, communication and/or surveillance over a wide area may be accommodated.

Depending upon the mission, the aerostat may be positioned at an altitude of many thousands of meters and securely connected to a ground based mooring system by means of a high strength lightweight tether.

A typical lightweight tether includes a non-metallic central strength member such as may be constituted by a plurality of layers of aromatic amide organic fibers surrounded by metallic braiding over which is formed a relatively flexible outer protective jacket. If the electronic payload is provided with power from a ground station, the tether may also include a central core of electrical conductors as well as signal conducting optical fibers.

The aerostat may be used in areas subject to lightning strikes and, accordingly, the aerostat is provided with a lightning shield which is electrically tied to the tether braid which forms a path for lightning induced current.

Such arrangement has not been entirely satisfactory since significant damage occurs to the tether when the lightning current transfers to the grounded mooring system. Basically, the surge current arcs through the outer jacket to the metallic portion of the mooring system and causes damage to the tether jacket and braid. In addition, for those tethers which have central power conductors, induced voltage in these conductors may exceed the dielectric strength of the non-metallic central strength member thereby causing a penetration and consequent damage.

Tether damage always requires the removal of the damaged portions from service. This represents a costly process since the tether cannot be spliced in any manner to lengthen it after its original manufacture, and accordingly, the removal of the damaged portion necessitates not only the removal of the damaged portion itself but the removal of several hundred to several thousand feet of tether from the damaged portion to the end of the tether. A tether therefore can take only so many lightning strikes before it has to be completely replaced. Additionally, the extensive downtime required for this process is undesirable since it reduces the operational availability of the system.

The present invention provides for a tether which is lighting hardened and does not require the costly section removal procedure employed with present day tethers.

SUMMARY OF THE INVENTION

The improved tether cable for connection to a structured used in an environment subject to lightning strikes includes a non-metallic central strength member which is surrounded by metallic braiding. An outer jacket surrounds the metallic braiding and is constructed and arranged such that a relatively small longitudinal portion thereof is interrupted defining a window which exposes the underlying metallic braiding. Means are provided for electrically connecting the exposed metallic braiding in the interrupted portion to an electrical ground system. In the preferred embodiment, the structure is a lightning shielded tethered aerostat carrying an electronic payload. In order to eliminate the requirement for on-board electrical power generators, the cable may include a central core of electrical conductors so that power may be sent up the tether from a power supply at the mooring system.

The mooring system preferably is one which includes a winch arrangement around which the tether is wound, with the tether passing around a grooved wheel, or sheave, which is connected to an electrical ground arrangement. A group of windows or interrupted portions may be provided in the cable jacket and spaced such that the exposed metallic braiding and at least one of the windows makes electrical contact with the sheave member during relatively small changes in altitude of the aerostat.

A sacrificial relatively soft wire may be wrapped around the exposed braid in the window to make electrical contact with the sheave member so that over prolonged use, the sacrificial wire winding may be easily replaced.

DESCRIPTION OF THE PREFERRED EMBODIMENT

Figure 1:
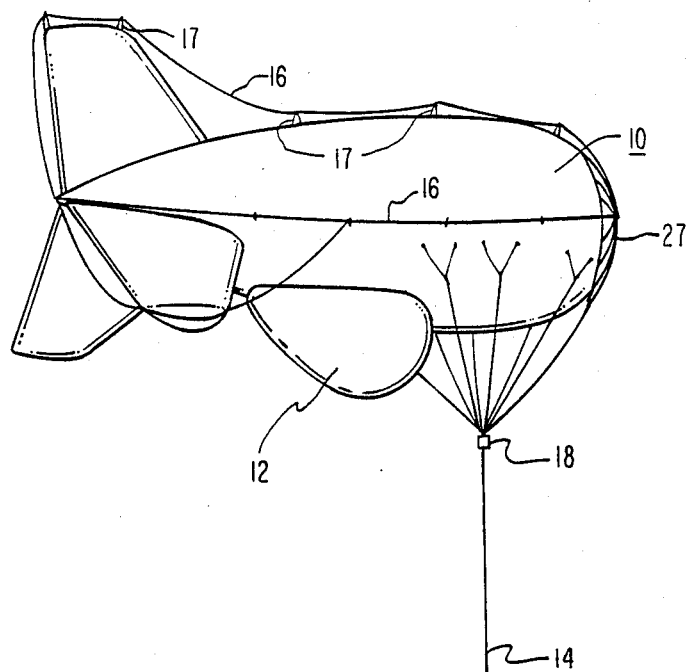
FIG. 1 is a view of an aerostat in a deployed condition connected to a typical ground mooring system.
Figure 1:
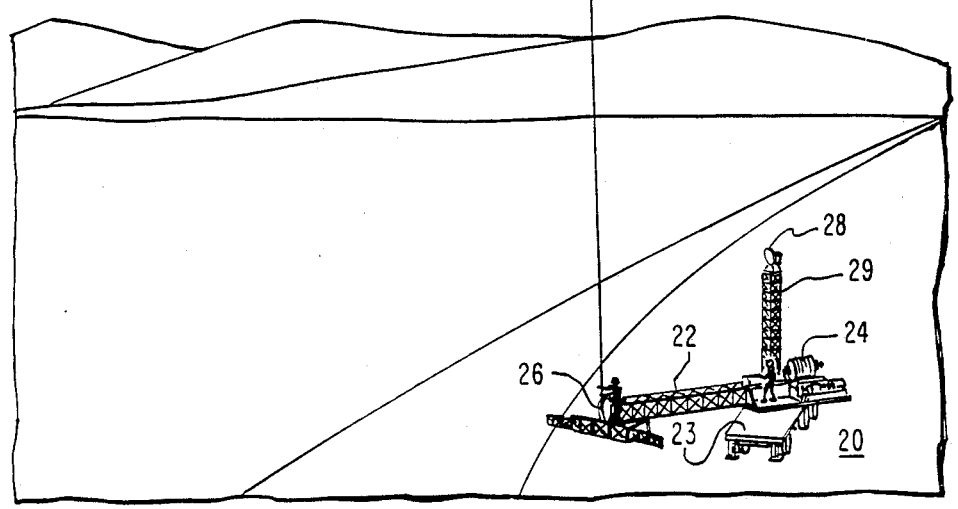

Although the invention is applicable for use with all types of structures, it will be described by way of example with respect to a tethered aerostat, a view of which, in a deployed condition, is illustrated in FIG. 1.

Aerostat 10 carries an electronic payload protected from the elements by an aerodynamically shaped windscreen 12 pressurized to maintain its aerodynamic shape. Typically, the aerostat may carry electronic equipment which may be utilized for such operations as coastal, air and ground surveillance, communications, over the horizon relays, rural telephone and emergency broadcast applications.

Aerostat 10 maintains its position above the lauch point by means of a single cable 14, called a tether, which anchors the aerostat in flight and which may provide electrical power to the airborne electronics through embedded conductors and which may also serve to conduct signals from the electronic equipment back down to a ground station.

In order to provide protection from lightning strikes, the aerostat includes a lightning protection system comprised of a plurality of guard wires 16 held at a distance from the aerostat skin by a series of standoffs 17 and connected to the metallic braid of the tether 14 by means of a low impedance slip ring at confluence point 18.

The mooring system 20 includes an elongated boom 22 which is rotatable about a base structure 23 and which carries a main winch 24 upon which the tether 14 is wound. Tether 14 passes from the winch 24 through the boom 22 and around a pulley 26, generally known as a flying sheave, located at the end of the boom and rotatable about the boom axis so that the sheave 26 and tether 14 are always in the same plane. When on the ground, the aerostat 10 is attached to the mooring system through mooring lines and a nose cone 27 on the aerostat mates with a nose latch assembly 28 at the top of tower 29, also carried by boom 22.

Figure 2:
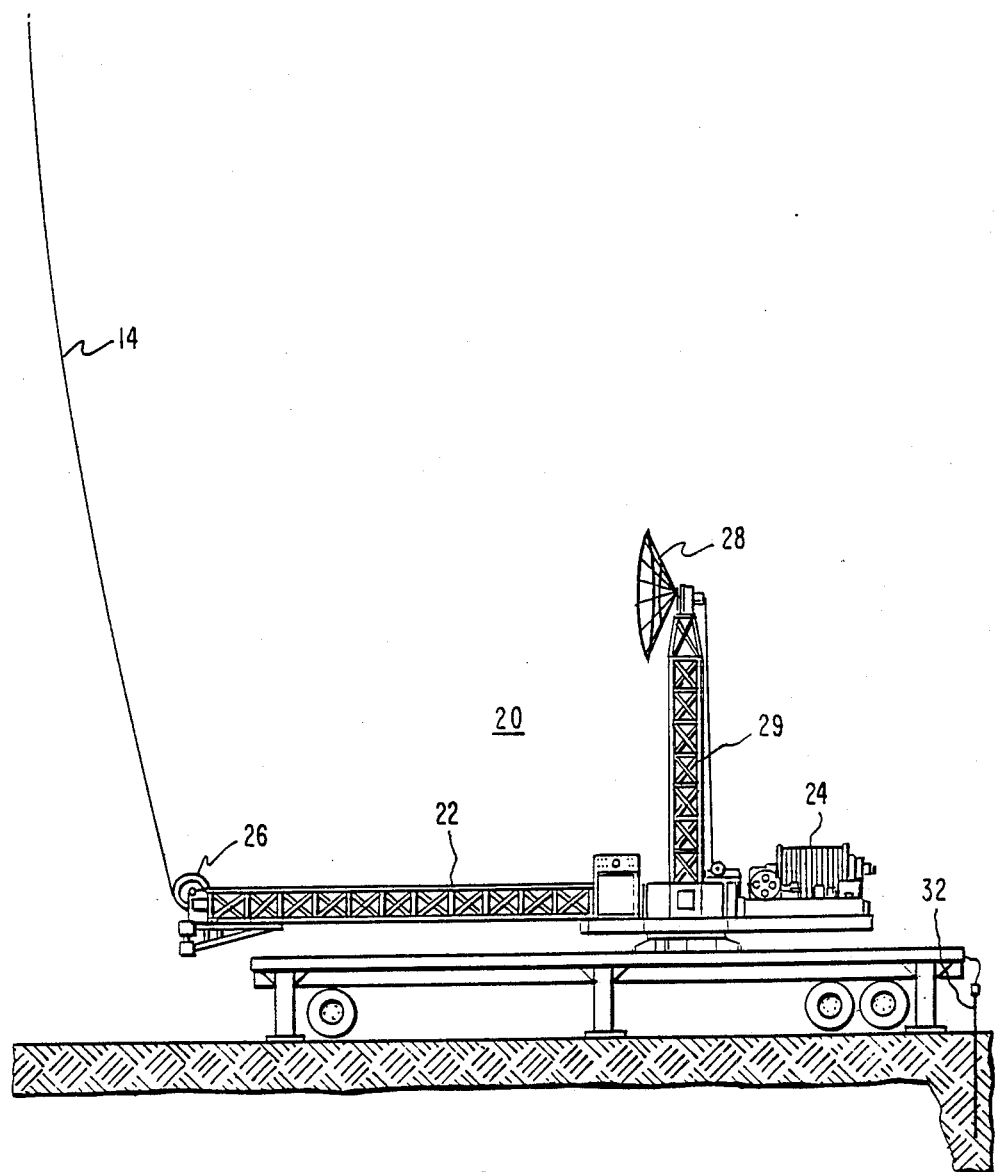
FIG. 2 is a somewhat more detailed view of the mooring system.

The mooring system 20, shown in somewhat more detail in FIG. 2, is connected to a grounding rod 32 and accordingly forms part of an electrical ground system. Although deployed operation in thunderstorms is generally avoided, operational situations exist wherein the aerostat is flown at its design altitude or at a predetermined fraction of its operating altitude during a thunderstorm. If lightning does strike the aerostat protection system, currents in the order of tens of thousands of amperes will be generated and will flow down the metallic braid of the tether and in many instances will seek a path to ground by way of the flying sheave 26. In so doing, the lightning induced current in the metallic braid traverses the outer protective jacket completely vaporizing and destroying it, as well as a portion of the braid. The design of the tether is such that it cannot be spliced and accordingly the damaged section cannot be repaired but instead requires the removal of perhaps hundreds to thousands of feet of cable from the damaged section to an end thereof.

Figure 3:
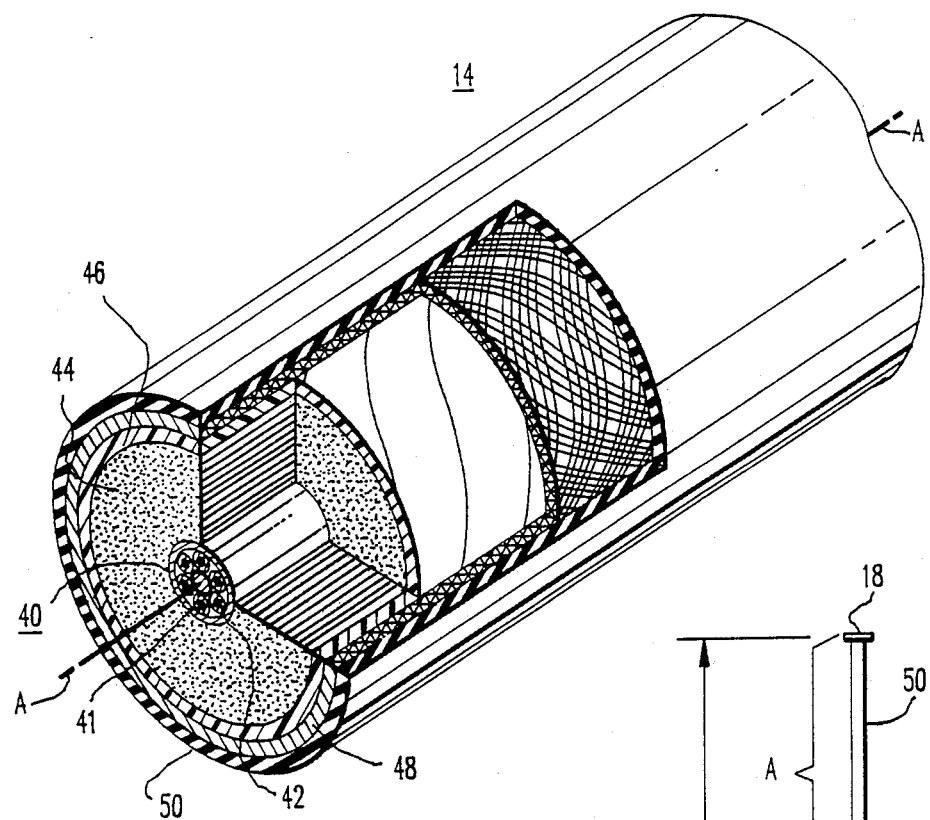
FIG. 3 is a cutaway view of a typical tether in current use.

A typical tether design in current use is illustrated in FIG. 3. For those applications wherein power is supplied from a ground station, tether 14 would include a central core 40 having a plurality of electrical power conductors 41 and, for some designs, a plurality of signal conductors such as optical fibers 42. The central conducting core is surrounded by a non-metallic central strength member 44 which may be made up of a plurality of layers of synthetic fibers such as aromatic amide organic fibers, one example of which is known as "Kevlar" produced by the DuPont Company of Wilmington, Delaware. A weather barrier in the form of a plastic wrap 46 surrounds the strength member 44 and is itself surrounded by a woven metallic braid 48 which conducts the lightning induced current. A relatively flexible outer protective jacket 50 of a constant diameter for the entire length of the tether completes the tether construction. The outer protective jacket 50 is generally made with embedded electrical conducting particles such that the jacket is semiconductive in order to handle relatively small current flow into the metallic braid due to atmospherically induced currents. The tether is fabricated as a unitary unspliced cable which extends along a central longitudinal axis A—A.

The tether design of the present invention eliminates the catastrophic destruction of the tether due to lightning induced currents discharging to ground through the tether jacket. One embodiment of the present invention is illustrated in the longitudinal sectional view of FIG. 4.

The tether 50 includes a central electrical core 52 surrounded by a non-metallic central strength member 54, as in the prior art type of construction.

Figure 4:
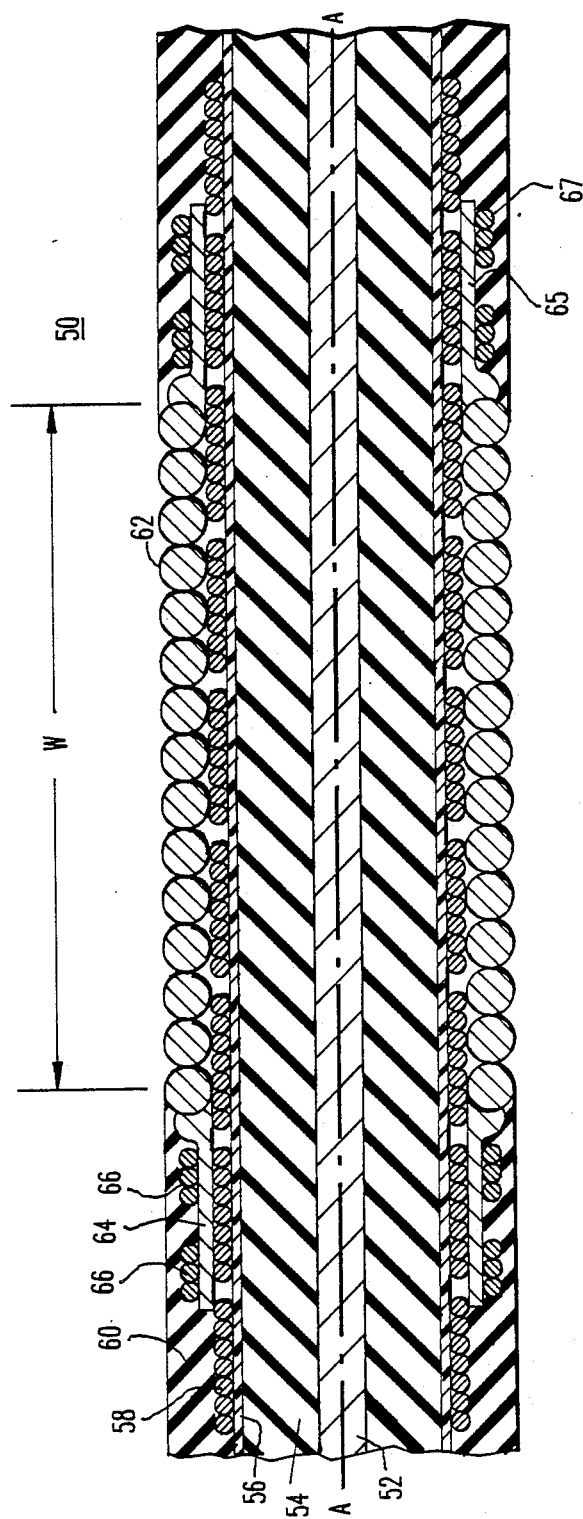
FIG. 4 is a longitudinal sectional view of one embodiment of the present invention.

A weatherproof barrier 56 surrounds the strength member 54 with the barrier in turn being surrounded by metallic braid 58. An outer protective jacket 60 is provided over the metallic braid 58, the jacket 60 being constructed and arranged such that a relatively small longitudinal portion is interrupted forming, in essence, a window which exposes the underlying metallic braiding 58. In FIG. 4, this interrupted portion of window extends in a longitudinal direction for a distance W.

As previously mentioned, the metallic braid conducts the lightning induced current and means are provided for connecting the metallic braid to an electrical ground system. In a preferred embodiment, electrical connection is made with the assistance of wire 62 which is wrapped over the underlying braid 58 and in electrical contact therewith. The wire 62 is exposed in the window formed by the interrupted portion of the outer jacket and may be held in place, by way of example, by means of tails 64 and 65 formed by the ends of the wrapped wire 62 being flattened and bent in the longitudinal direction of the tether and thereafter maintained in position by means of lashing 66 and 67.

In fabricating the exposed window and wrapped wire 62, a portion of the outer jacket 60 would normally be removed in excess of the width W in order to accommodate a tail portion 64 and 65. After securing the tail portions in place, a new section of jacketing material 60 may be melted in place while still maintaining the interrupted portion of length W. If desired, prior to the wrapping of wire 62, a conducting grease may be applied to the underlying braid 58 to aid in the prevention of braid contamination.

In view of the close match maintained between the outer diameter of the tether and the sheave or sheaves of the mooring system, any portion of the tether with an increased diameter would necessarily create a wear and stress point which would adversely affect the proper functioning of the tether. Accordingly, the diameter of the wire 62 which makes electrical contact with the underlying current carrying metallic braid 58 should be selected such that the resultant diameter in the window portion (of longitudinal length W) is no greater than the diameter of the outer jacket 60.

In a preferred embodiment of the invention, metallic braid 58 is of a high strength metal such as nickel plated high strength copper and the wrapped wire 62 is a tin plated soft copper. The nickel plated high strength copper braid has high strength and abrasion resistance and in addition has high current carrying ability and can withstand relatively high temperatures. The wrapped wire 62 configuration ensures that the contact area to electrical ground is flexible so as to move over the various sheaves in the mooring system. During such movement, the electrical contact area will rub against the sheave as the tether moves slightly due to the motions of the aerostat. In view of the soft copper nature of wire 62, the wire will act as a sacrificial element which when worn down a predetermined distance may be easily replaced in the field.

During normal operation, the aerostat will move relative to the mooring system due to wind shifts and the actual flexing of the tether under resulting variations in tether load. In order that electrical contact be maintained between the current carrying metallic braid of the tether and the grounded flying sheave during this limited aerostat movement, an arrangement such as illustrated in FIG. 5 may be provided.

Figure 6:
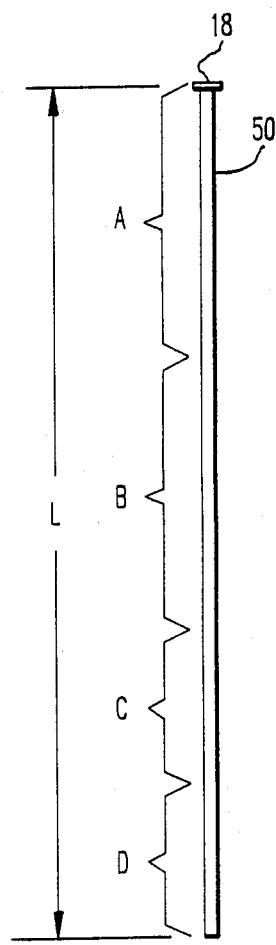
FIG. 6 illustrates a tether divided into a plurality of sections.
Figure 5:
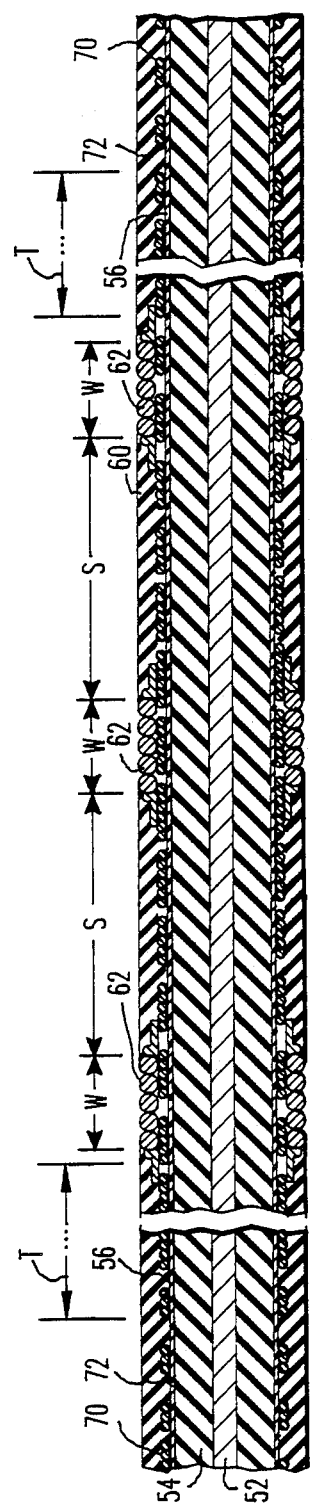
FIG. 5 is a longitudinal sectional view of another embodiment of the present invention.

The tether of FIG. 5 includes a plurality of window areas in jacket 60 each including a wrapped wire 62 (not to scale) as in the FIG. 4 construction with each area of longitudinal length W being spaced from an adjacent area by the distance S. The illustrated distances will of course depend upon the tether diameter as well as the flying sheave diameter. By way of example, for a tether diameter of ½ inch (1.27 cm) and a sheave diameter of 25 inches (63.5 cm) the distance W may be 1 inch (2.54 cm) and the distance S may be 6 inches (15.24 cm). Where the aerostat is to fly at different predetermined altitudes, additonal sets of wire wrapped windows may be provided at appropriate locations along the tether. By way of example, with additional reference to FIG. 6, a typical tether 50 of total length L is illustrated as being divided into a plurality of sections A, B, C and D. For reference purposes, the top of the tether is at confluence point 18.

It will be appreciated that aerostats and tethers are designed for many different missions and are flown at various different altitudes. By way of one example, the aerostat and tether may be designed for a mission altitude of 2000 feet (609.6 meters) and for such mission a tether with a length L equal to 3000 feet (914.4 meters) may be fabricated. Sections A and B are each of 1000 foot lengths (304.8 meters) and Sections C and D are each of 500 foot lengths (152.4 meters). In a typical tether fabrication, Section C may be designed to have the interrupted portions to form one or more sets of wire wrapped windows as illustrated in FIG. 5. In such instance the metallic braiding in Section C will be of the nickel plated relatively densely woven high strength copper while the remaining sections may be of less densely woven soft annealed copper wire. This construction is preferred since the application of high density braid over the entire length of the tether is costly and creates an undesirable weight addition. The high density braid is required only where the windows are to be formed. The low density braid (and accordingly the high density braid) is designed to shield the central electrical conductors from induced currents, caused by a lightning strike, which would exceed the dielectric constant of the non-metallic strength member.

During the manufacturing process, the high density metallic braid 68 is gradually woven in and out to replace the lower density metallic braid 70 in a transition zone T illustrated in FIG. 5. This type of construction ensures that no stress concentration points or discontinuities in electrical contacts occur.

Sections A, B and D of the cable include a waterproof barrier 72 which may be of wrapped overlapping construction. It is preferable however that the weatherproof barrier 56 in Section C where the wire wrapped windows are located be of a completely sealed construction. For this purpose, therefore, weatherproof barrier 56 may be fabricated from a heat sealable plastic tape such as "Mylar" with the heat sealing being accomplished during the elevated temperatures encountered when the outer jacket 60 is applied to the cable.

During constant operation over a period of months or years, the tether may experience normal wear at its upper portion where connection to the confluence point is made. Periodic servicing of the apparatus results in a short section of the upper portion of the tether being removed. In such instance, a new set of windows may be formed at a lower portion of Section C to accommodate for the removal. Of course other types of construction are possible including one wherein Section A or a portion thereof is fabricated with the heat sealed weather barrier and high density metallic braid to accommodate for wire wrapped windows and wherein during the approach of a thunderstorm, the aerostat may be brought down to a predetermined lower altitude to weather the storm.

Accordingly, there has been described an improved cable which may be connected to a structure subject to lightning strikes, such as an aerostat with the cable acting as a tether which can transmit and transfer to an electrical ground system lightning charges up to many tens of thousands of amperes while sustaining no electrical or mechanical damage. This advancement enhances the operational availability of the equipment and decreases the operating cost of systems which, by mission requirements, must operate in a lightning environment. The tether construction eliminates the requirement for removing sections of tethers after a lightning strike and accordingly the operating life of a tether is greatly enhanced.

We claim:

1. A lightning hardened tether cable, comprising:
   (A) a non-metallic central strength member;
   (B) metallic braiding surrounding said strength member for connection to a structure used in an environment subject to lightning strikes;
   (C) an outer jacket surrounding said metallic braiding;
   (D) said outer jacket being constructed and arranged such that at least one relatively small longitudinal portion thereof is interrupted to define a window which exposes said metallic braiding; and
   (E) means for electrically connecting the exposed metallic braiding in said interrupted portion to an electrical ground system.

2. Apparatus according to claim 1 wherein:
   (A) said means for electrically connecting includes a wire having a plurality of turns wrapped around, and in electrical contact with, said metallic braiding in said window.

3. Apparatus according to claim 2 wherein:
   (A) the ends of said wrapped wire are bent in a direction substantially parallel to the longitudinal axis of said cable and are disposed beneath said outer jacket.

4. Apparatus according to claim 3 wherein:
   (A) said ends of said wrapped wire are lashed to said metallic braiding.

5. Apparatus according to claim 2 wherein:
   (A) said metallic braiding is of a relatively high strength copper and said wrapped wire is of a relative soft copper.

6. Apparatus according to claim 5 wherein:
   (A) said metallic braiding is nickel plated and said wrapped wire is tin plated.

7. Apparatus according to claim 2 wherein:
   (A) the outside diameter of said cable at the location of said wrapped wire is not greater than the outside diameter of said outer jacket.

8. Apparatus according to claim 1 which includes:
   (A) a weatherproof barrier interposed between said strength member and said metallic braiding.

9. Apparatus according to claim 8 wherein:
   (A) said weatherproof barrier which underlies said window is seamless.

10. Apparatus according to claim 9 wherein:

(A) said seamless weatherproof barrier is formed of a heat sealed wrapped plastic film.

11. Apparatus according to claim 10 wherein:
(A) said cable includes portions having non-heated sealed wrapped plastic film.

12. Apparatus according to claim 1 wherein:
(A) the weave density of said metallic braiding which underlies said window is greater than the weave density of said metallic braiding at predetermined other sections of said cable.

13. Apparatus according to claim 12 wherein:
(A) said metallic braidings of different weave densities are gradually joined together in a longitudinal transition zone.

14. Apparatus according to claim 13 wherein:
(A) the outside diameter of said cable at said transition zone is no greater than the outside diameter of the remainder of said cable.

15. In combination:
(A) an aerostat having a lightning protection system;
(B) an electrically grounded aerostat mooring system;
(C) a tether cable connecting said aerostat with said mooring system;
(D) said cable including:
  (i) a non-metallic central strength member;
  (ii) member braiding surrounding said strength member;
  (iii) an outer jacket surrounding said metallic braiding;
  (iv) said outer jacket being constructed and arranged such that at least one relatively small longitudinal portion thereof is interrupted to define a window which exposes said metallic braiding; and
  (v) means for electrically connecting the exposed metallic braiding in said interrupted portion to said mooring system; and
(E) said metallic braiding being electrically connected to said lightning protection system.

16. Apparatus according to claim 15 wherein:
(A) said mooring system includes a flying sheave at the end of a boom;
(B) said cable passes around said flying sheave; and
(C) said flying sheave is electrically connected to an electrical ground.

17. Apparatus according to claim 16 wherein:
(A) said means for electrically connecting includes a wire having a plurality of turns wrapped around, and in electrical contact with, said metallic braiding in said window; and
(B) said cable includes a plurality of said windows located at positions such that when said aerostat is deployed at a predetermined altitude, the turns of wrapped wire in at least one of said plurality of windows will contact said flying sheave during normal limited altitude changes of said aerostat.

18. Apparatus according to claim 15 wherein:
(A) said cable includes an inner core of electrical conductors.

19. Apparatus according to claim 18 wherein:
(A) said inner core additionally includes signal conducting optical fibers.

* * * * *